(12) United States Patent
Meyer, Jr.

(10) Patent No.: US 7,958,616 B2
(45) Date of Patent: Jun. 14, 2011

(54) PORTABLE CORRAL AND METHOD

(76) Inventor: Louis A. Meyer, Jr., Cherokee, OK (US)

( * ) Notice: Subject to any disclaimer, the term of this patent is extended or adjusted under 35 U.S.C. 154(b) by 968 days.

(21) Appl. No.: 11/823,883

(22) Filed: Jun. 29, 2007

(65) Prior Publication Data

US 2009/0000564 A1 Jan. 1, 2009

(51) Int. Cl.
*B23Q 3/00* (2006.01)
*E04H 17/18* (2006.01)
(52) U.S. Cl. .......................... 29/468; 119/514
(58) Field of Classification Search ............ 29/428, 29/897, 897.3, 897.312, 897.32, 897.33, 29/468; 119/514, 512, 712, 502; 292/264
See application file for complete search history.

(56) References Cited

U.S. PATENT DOCUMENTS

| | | | |
|---|---|---|---|
| 4,924,813 A | 5/1990 | Bixler et al. | |
| 4,960,074 A | 10/1990 | Wilson | |
| 5,115,763 A | 5/1992 | Wilson | |
| 5,237,960 A | 8/1993 | Wilson | |
| 5,918,896 A * | 7/1999 | Jenkins, Jr. | 280/457 |
| 2006/0065209 A1* | 3/2006 | May et al. | 119/502 |

* cited by examiner

*Primary Examiner* — John C Hong
(74) *Attorney, Agent, or Firm* — John W. Carpenter

(57) ABSTRACT

A method is provided for locking a chain in a locking device. The method includes sliding a chain along a surface of a chain-locking device until contacting another surface of the chain-locking device. Subsequently, the chain is slid along the contacted surface until reaching the end of the contacted surface. At the end, or in close proximity thereto, the chain passes, or falls, or is slid into a slot of the chain-locking device to lock the chain in place. A method is also provided for coupling together a pair of portable-corral members. A portable-corral panel is provided as having a panel support structure, and a portable-corral door connected to and within the panel support structure such as to be generally flush with the panel support structure when in a closed posture. A method is provided for directing the movement of livestock with a collapsible portable-corral by opening a portable-corral gate which is pivotally secured to and within a portable-corral support structure, and moving livestock through the opened portable-corral gate. Also provided is a portable-corral gate assembly comprising a portable-corral gate support structure, and a portable-corral gate coupled to the portable-corral gate support structure.

19 Claims, 14 Drawing Sheets

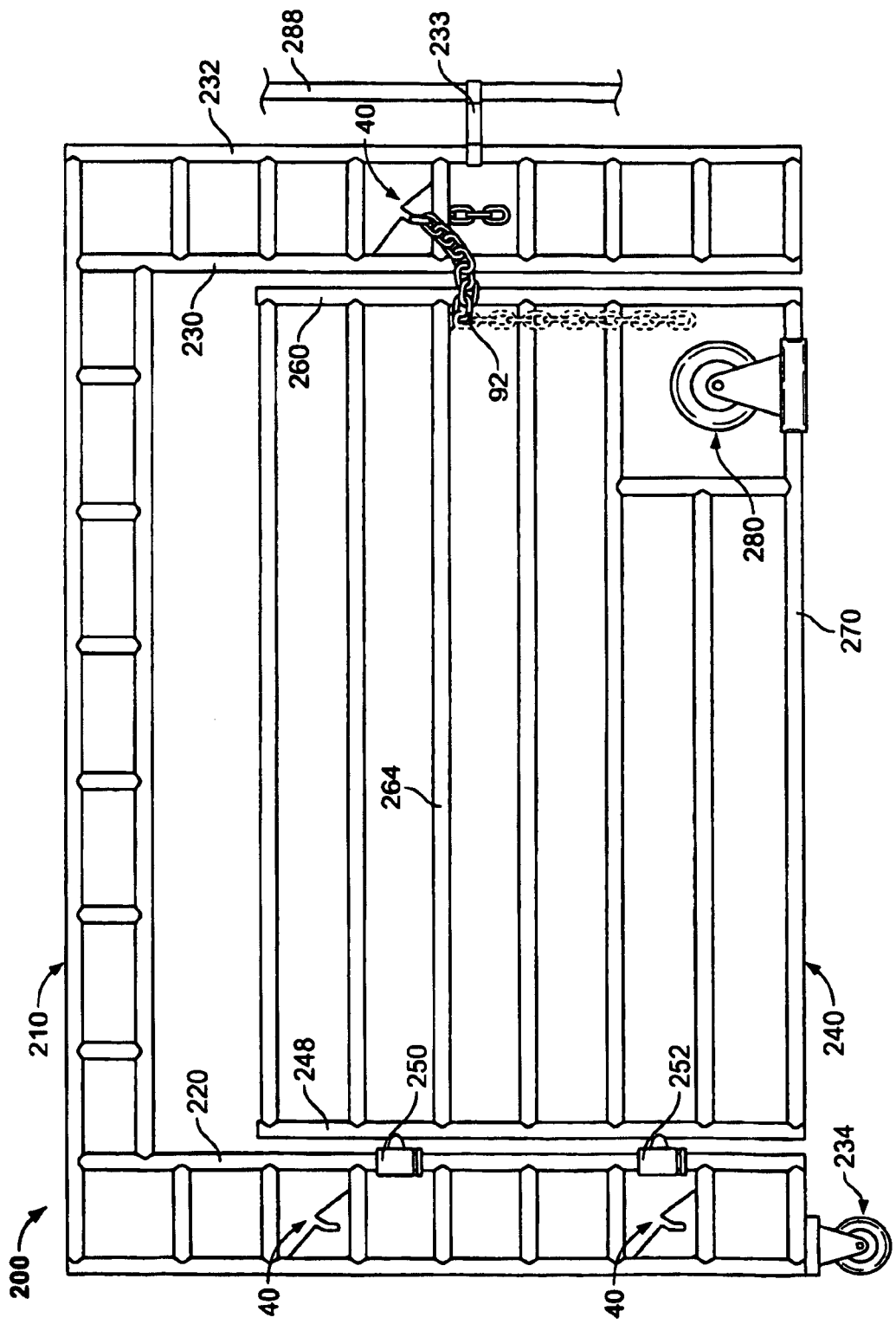

PORTABLE CORRAL AND METHOD

FIELD OF THE INVENTION

Embodiments of the present invention are related to a collapsible portable corral. More specifically, embodiments of the present invention provide a collapsible portable coral assembly and method for corralling animals, such as livestock (e.g., cattle and the like).

BACKGROUND OF THE INVENTION

There are a number of conventional collapsible portable corral, such as that disclosed in U.S. Pat. No. 4,960,074, fully incorporated here by reference thereto, as if repeated verbatim hereafter. While the collapsible portable corral disclosed and illustrated in this patent is capable of confining and directing the movement of livestock, it does have some limitations. For example, if livestock is to be confined in certain sections of the corral assembly, entire panel members must be moved. Also, coupling of panels together is not as efficient as desired. Therefore, what is needed and what has been invented is an improved collapsible portable corral and method which facilitates the confining and directing the movement of livestock.

SUMMARY OF EMBODIMENTS OF THE INVENTION

Embodiments of the present invention provide a method for locking a chain in a locking device. The method includes sliding a chain along a surface of a chain-locking device until contacting another surface of the chain-locking device. Subsequently, the chain is slid along the contacted surface until reaching the end of the contacted surface. At the end, or in close proximity thereto, the chain passes, or falls, or is slid into a slot of the chain-locking device to lock the chain in place.

Embodiments of the present invention further provide a method for coupling together a pair of portable-corral members of a collapsible portable corral. The method comprises engaging a chain member which is coupled to a portable-corral member to a chain locking device which is coupled to another portable-corral member.

Embodiments of the present invention also provide a portable-corral gate assembly comprising a gate support structure, and a portable-corral gate coupled to the gate support structure. The portable-corral gate is generally flush with the gate support structure when in a closed posture.

Embodiments of the present invention also further provide a panel door member which is coupled to and within a panel of a collapsible portable-corral. When the panel door member is closed, it is generally flush with the face of panel. Alternative embodiments comprise a portable-corral panel which includes a panel door member pivotally connected to a portable-corral member of a collapsible portable corral panel. The panel door member may be opened to allow a person to exit and enter a pen.

Embodiments of the present invention also further provide a method for directing the movement of livestock comprising opening a portable-corral gate which is coupled to a portable-corral gate structure, and moving livestock into a portable-corral pen.

These provisions, together with the various ancillary provisions and features which will become apparent to those skilled in the art as the following description proceeds, are attained by the methods and assemblies of the present invention.

BRIEF DESCRIPTION OF THE DRAWINGS

FIG. 16 is a side elevational view of an embodiment of a support structure having an upright panel vertical bar hinged to an upright support bar by a hinge which is coupled to the panel member illustrated in FIG. 6.

DETAILED DESCRIPTION OF THE EMBODIMENTS OF THE INVENTION

In the description herein, numerous specific details are provided, such as examples of components and/or methods, to provide a thorough understanding of the embodiments of the present invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials, or operations are not specifically shown or described in detail to avoid obscuring aspects of the embodiments of the present invention.

Figure 1:
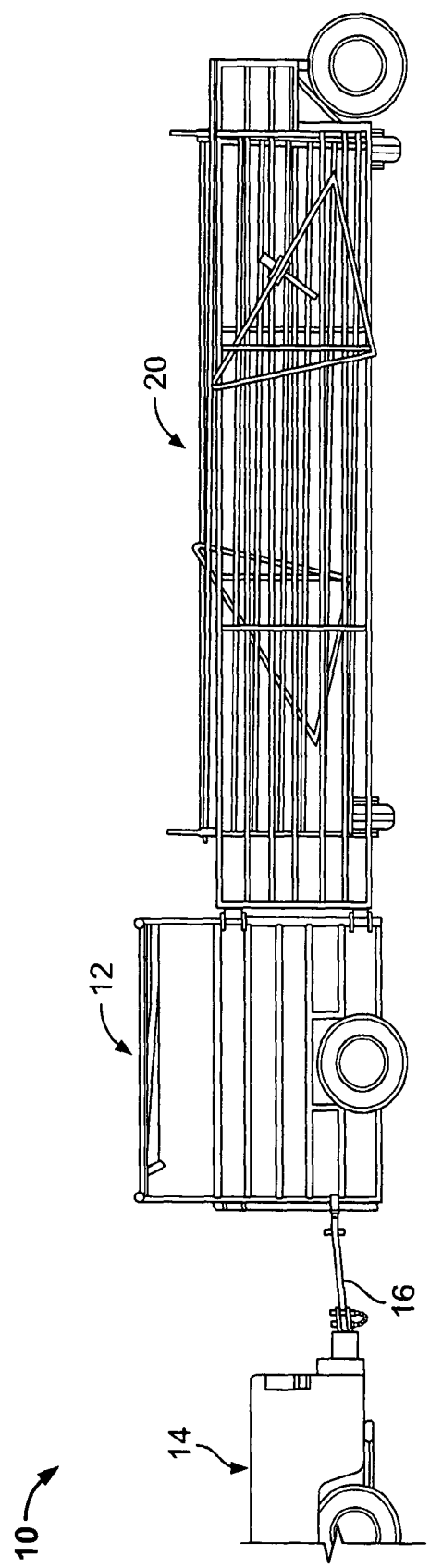
FIG. 1 is a side elevational view of a prior art corral in a folded position and being towed by a vehicle.

Referring now to FIGS. 1-4 of the drawings for illustrating a prior art collapsible portable corral, there is seen in FIG. 1 a side elevational view of a prior art corral, generally illustrated as 10, and described in detail in U.S. Pat. Nos. 4,960,074, 5,115,763, and 5,237,960, all of which are incorporated herein by reference thereto as if repeated verbatim. The corral 10 includes a chute assembly 12 in a folded position and coupled to a vehicle 14 by a tongue member 16. The corral 10 is capable of being moved to any desired location by the vehicle.

Figure 2:
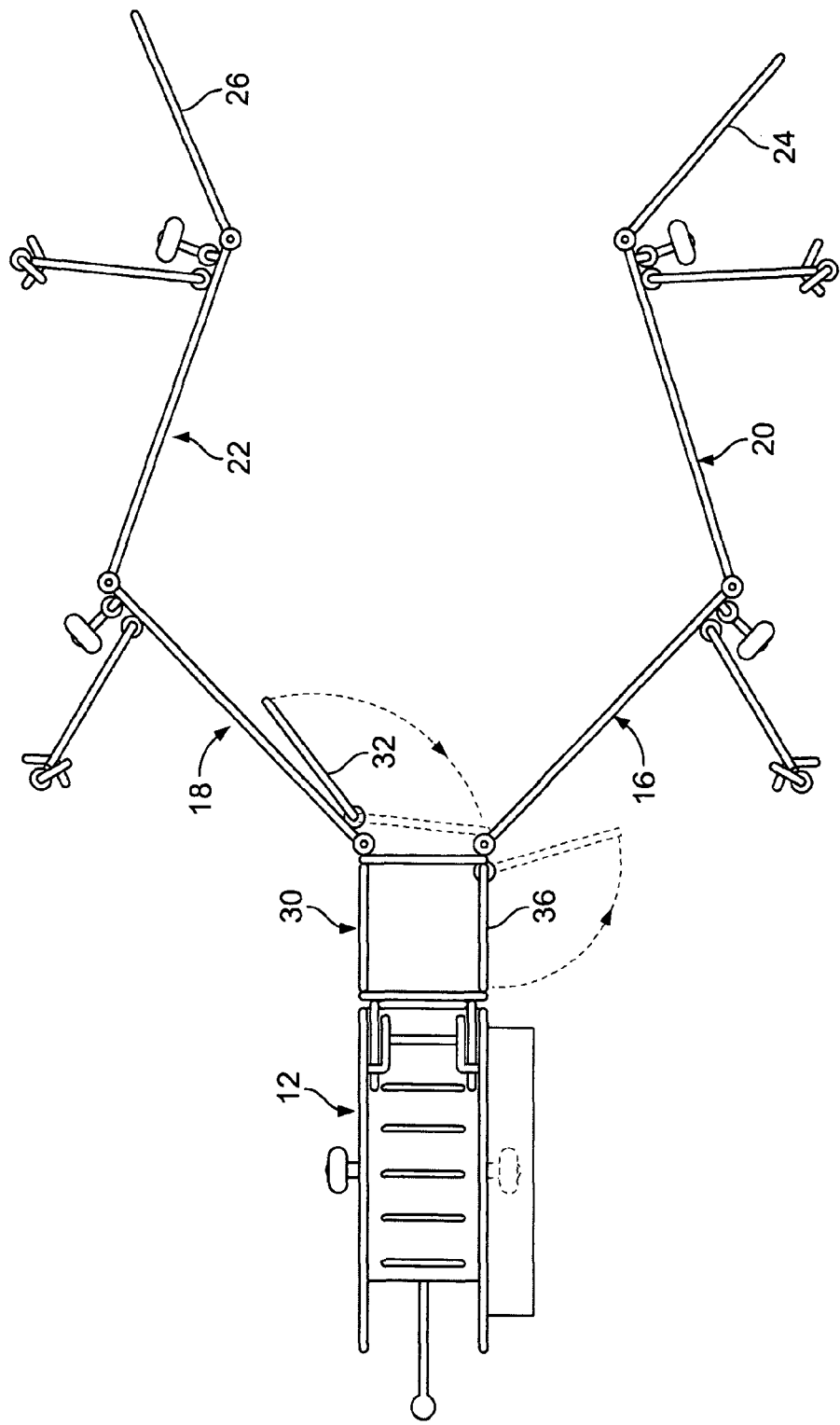
FIG. 2 is a top plan view of the corral of a prior art corral with side fences or panels moved outwardly to form a corral.

As best shown in FIG. 2, the corral 10 also includes a plurality of fences or panels 20 which are pivotally interconnected for being pivoted into any desired location. As illustrated in U.S. Pat. No. 4,924,813, the plurality of panels 20 respectively broadly comprise a plurality of stanchions and a plurality of horizontal bars. The plurality of panels 20 further comprise a pair of front sections, generally illustrated as 16 and 18. Intermediate sections generally illustrated as 20 and 22, respectively pivotally connect front sections 16 and 18. The prior art corral 10 is provided with a pair of rear sections, generally illustrated as 24 and 26, which respectively pivotally attach to intermediate sections 20 and 22, as best illustrated in FIG. 2. As further best shown in FIG. 2, coupled to the chute assembly 12 is a diverter assembly 30 which is provided with gates 32 and 36.

Figure 3:
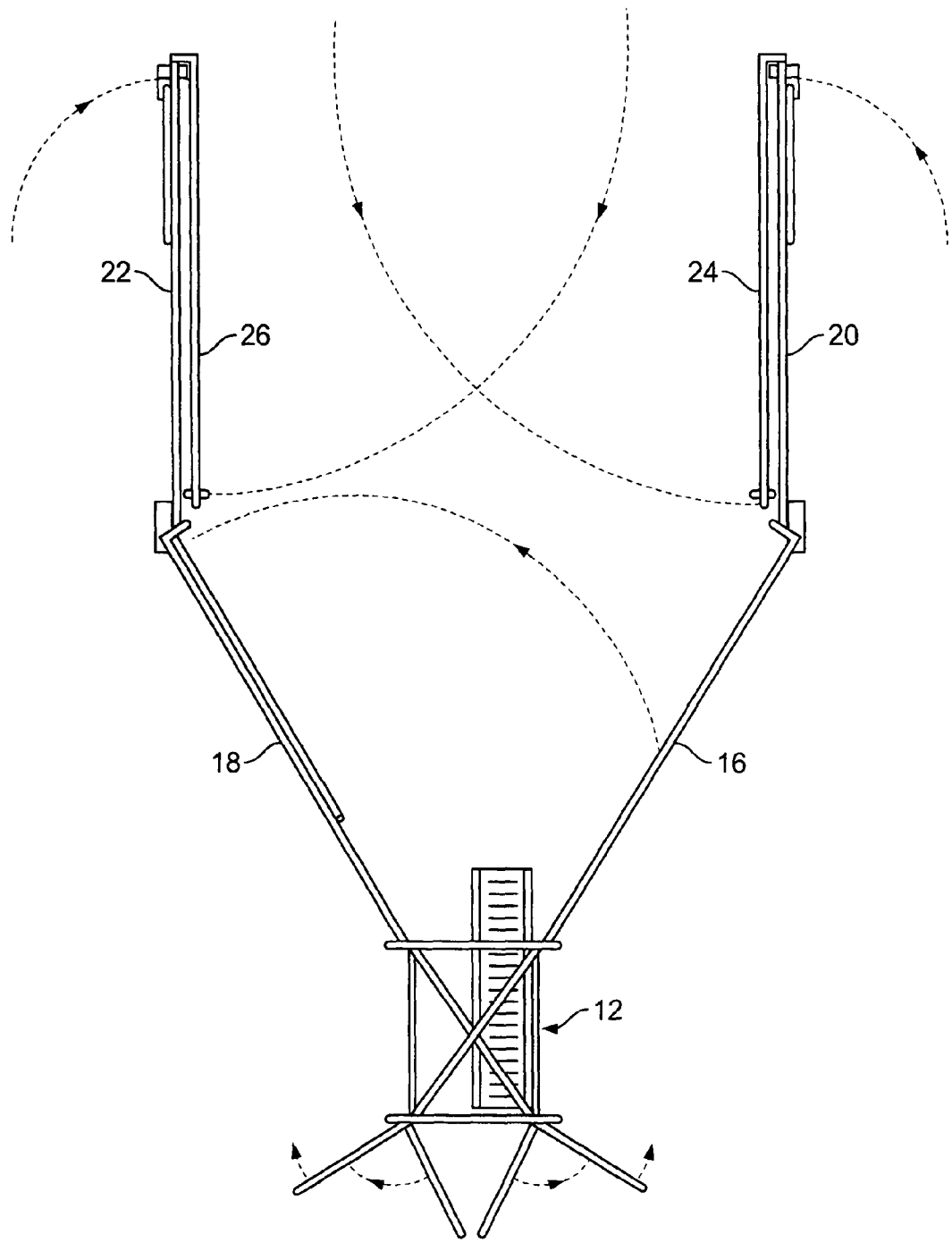
FIG. 3 is a top plan view of a prior art corral of the rear sections of the corral of FIG. 1 having been pivoted against respective contiguous immediate sections, which are the initial steps for folding the unfolded corral.
Figure 4:
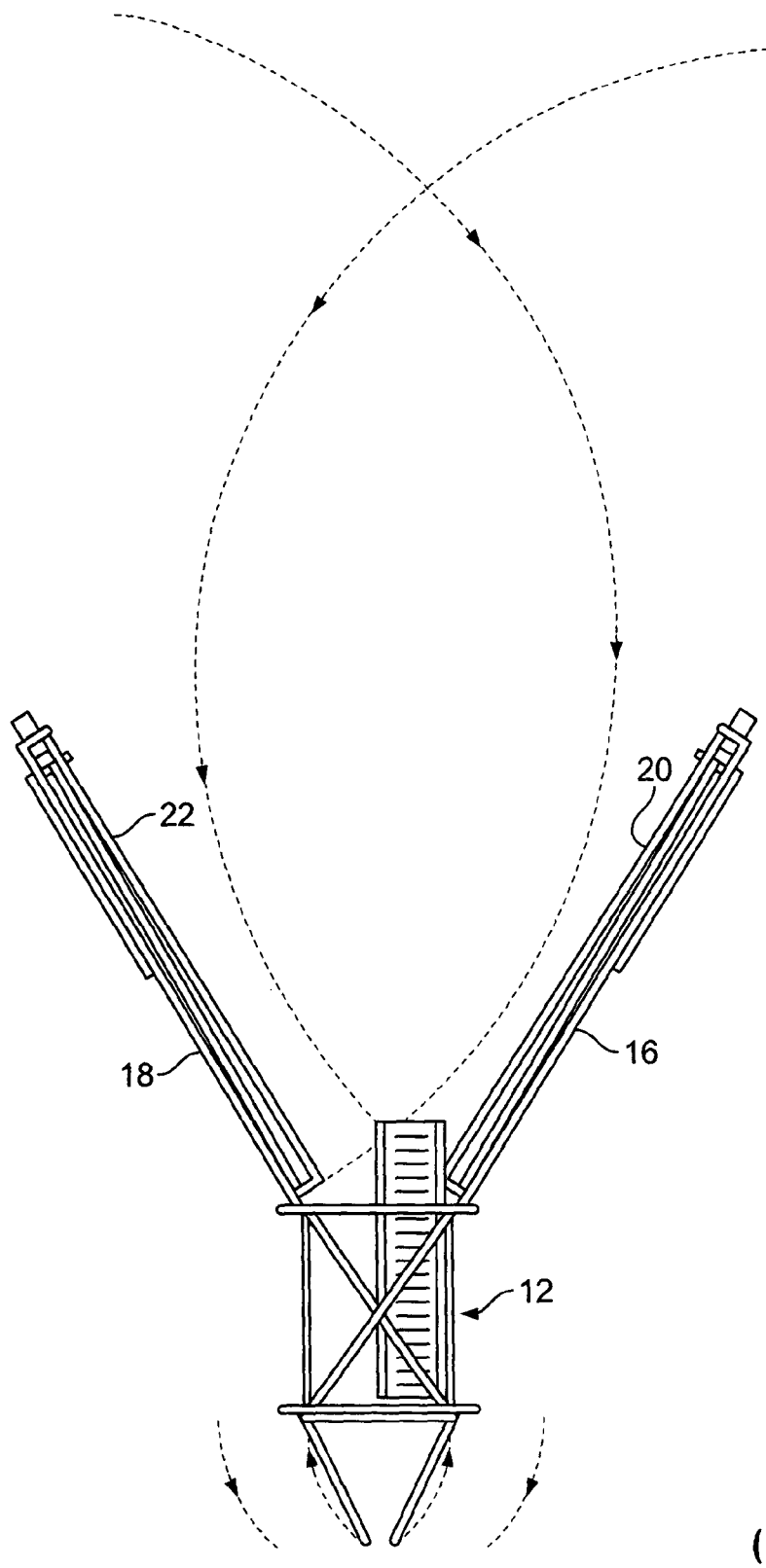
FIG. 4 is a top plan view of a prior art corral being folded after the respective combined intermediate sections/rear sections have been pivoted against their respective contiguous front sections.

Referring now to FIGS. 3 and 4, there is seen a top plan view of the prior art corral 10 representing the initial steps for folding an unfolded corral. Initially the rear sections 24 and 26 are respectively pivoted towards and against the intermediate sections 20 and 22 as represented by the direction of the arrows. Subsequently and as best shown in FIG. 4, the respective combined intermediate sections/rear sections (i.e., sections 20/22 and sections 24/26) are pivoted towards and against their respective contiguous front sections 16 and 18 to complete the folding of the unfolded corral with the direction of arrows representing the movement of the various sections.

Referring in detail now to FIGS. 5-15 the drawings, wherein similar parts of the invention are identified by like reference numerals, there is seen in FIGS. 11-14 an embodiment of a locking assembly, generally illustrated as 40, for coupling together various members of the collapsible portable corral. As will be further illustrated below, the various members of the collapsible portable corral include, by way of example only, a corral gate coupled to a gate-support structure which supports the corral gate, a corral gate assembly coupled to a panel member of the collapsible portable corral, and a portable-corral door member coupled to a panel member which supports the door member. The spirit and scope of various embodiments of the present invention include the locking assembly 40 as being employed to couple together any various corral members of the collapsible portable corral, and is not to be limited to the various corral members illustrated herein.

In an embodiment of the locking assembly 40, there is seen (see FIGS. 13 and 14) a generally triangular appearing member 44, having surfaces 48, 52, 56 and 60. Also seen in the embodiment of the locking assembly 40 is a slot assembly, generally illustrated as 64. The slot assembly 64 comprises an upper (open) slot, generally illustrated as 70 and having surfaces 72 and 76 which are generally opposed to each other. More specifically, surface 72 is opposed to surface 76 in a generally parallel (equidistant) relationship. In an embodiment of the invention, surface 72 of upper slot 70 is higher than, or extends beyond, surface 48.

The slot assembly 64 further comprises a lower slot, generally illustrated as 80. Slot 80 has a pair of generally opposed surfaces 84 and 88 which are preferably disposed in a generally parallel (equidistant) relationship which terminate in bottom 92. The distal ends of surfaces 72 and 76 of upper slot 70 respectively meet or terminate at the proximate ends to surfaces 84 and 88 of lower slot 80. The bottom of upper slot 70 is in direct communication with the top of lower slot 80.

The relationship between upper slot 70 and lower slot 80 may be in any suitable relationship, such as generally normal with respect to each other or obliquely situated with respect to each other. In an embodiment of the invention, the relationship between slots 70 and 80 is an oblique relationship. In such a relationship, a plane along the surface 72 of upper slot 70 is at an oblique angle with a plane along surface 84 of lower slot 80. As a further explanation of such an oblique relationship, a plane along the surface 76 of upper slot 70 is at an oblique angle with a plane along surface 88 of lower slot 80.

Figure 11:
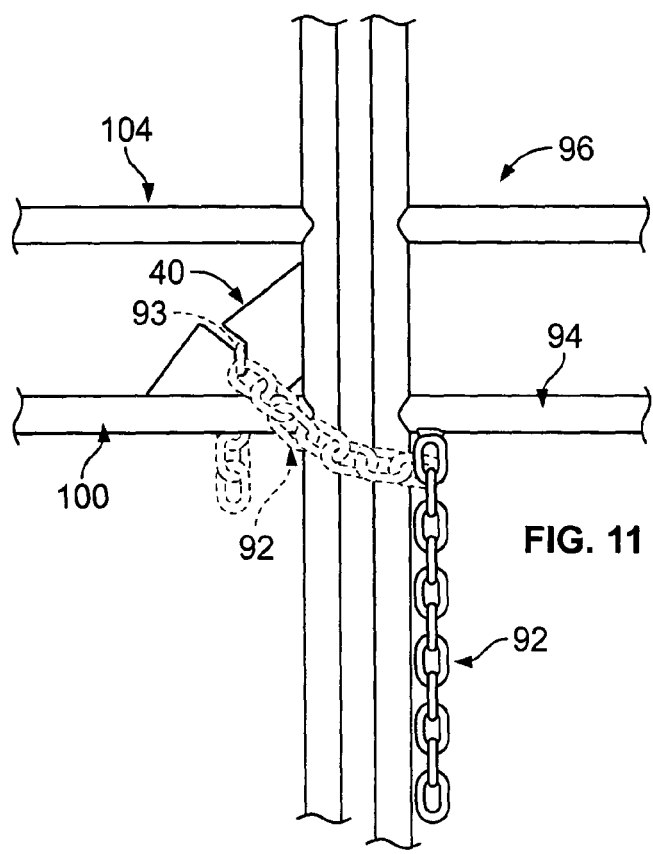
FIG. 11 is an elevational view illustrating an embodiment of the chain locking device coupled to a portable-corral member, and further illustrating a chain coupled to another portable-corral member, with the dashed lines representing the position of the chain when engaged to the chain locking device.

In operation of the embodiment of the invention depicted in FIGS. 11-14, the locking assembly 40 may be employed in, or for, any suitable purpose in the collapsible portable corral. In an embodiment of the invention, the locking assembly 40 may be used for coupling together any suitable pair of portable-corral members. By way of example, there is seen in FIG. 11 a chain member 92 coupled to a bar 94 of a portable-corral member 96. The locking assembly 40 is supported by a structure of another portable-corral member 104. More specifically, the portable-corral member 104 has a bar 100 that engages and connects to surface 56 of the locking assembly 40.

Figure 12:
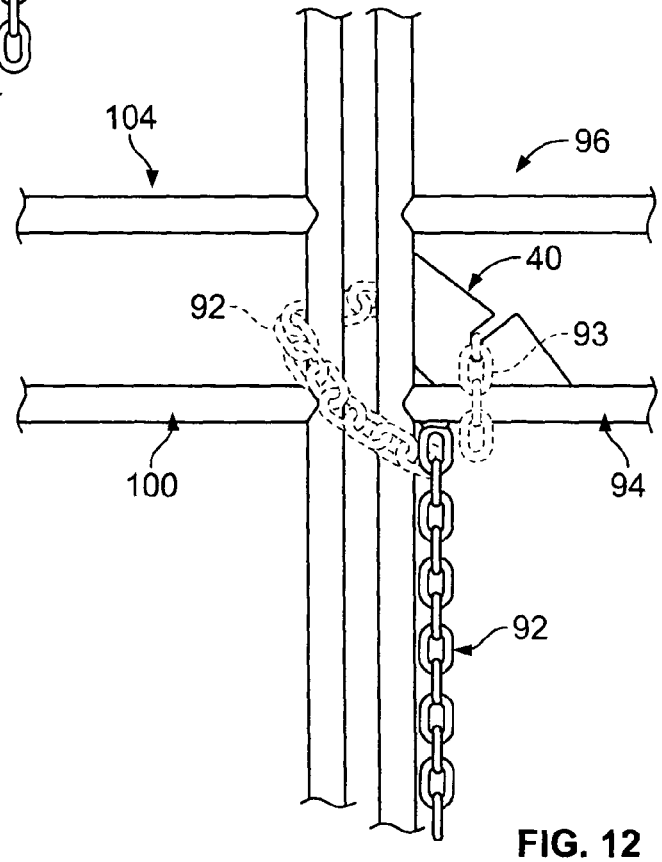
FIG. 12 is an elevational view of another embodiment of the invention wherein the locking device is coupled to the same portable-corral member that has the chain coupled thereto.

In another embodiment of the invention and as best illustrated in FIG. 12, the locking assembly 40 (e.g. surface 56 of locking assembly 40) may be supported by and connected to bar 94 of portable-corral member 94 which also engages and supports chain member 92. Thus, the locking assembly 40 may be supported by and connected to a different portable-corral member that supports and engages chain member 92, or it may be supported by and connected to the same portable-corral member that supports and engages chain member 92.

Figure 13:
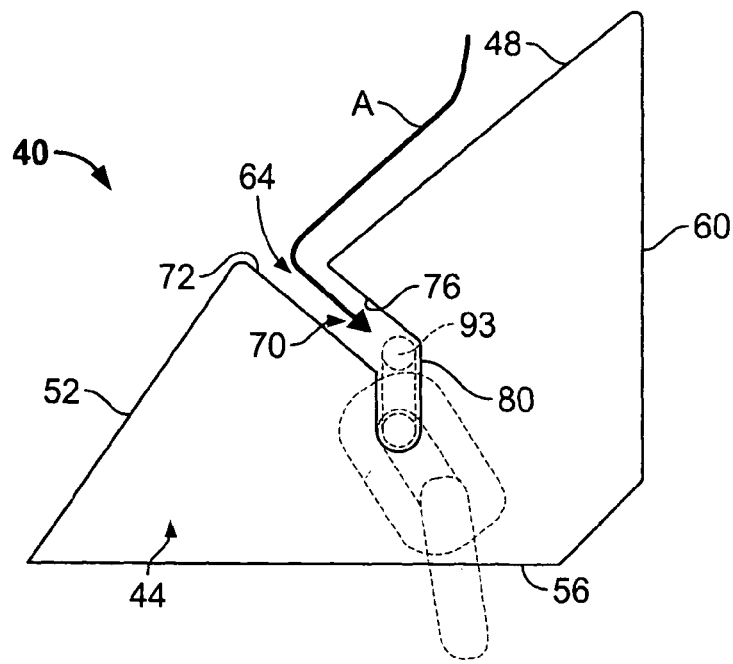
FIG. 13 is an elevational view of the chain locking device with the arrow representing the path of the chain for lodging into a slot of the chain locking device.
Figure 14:
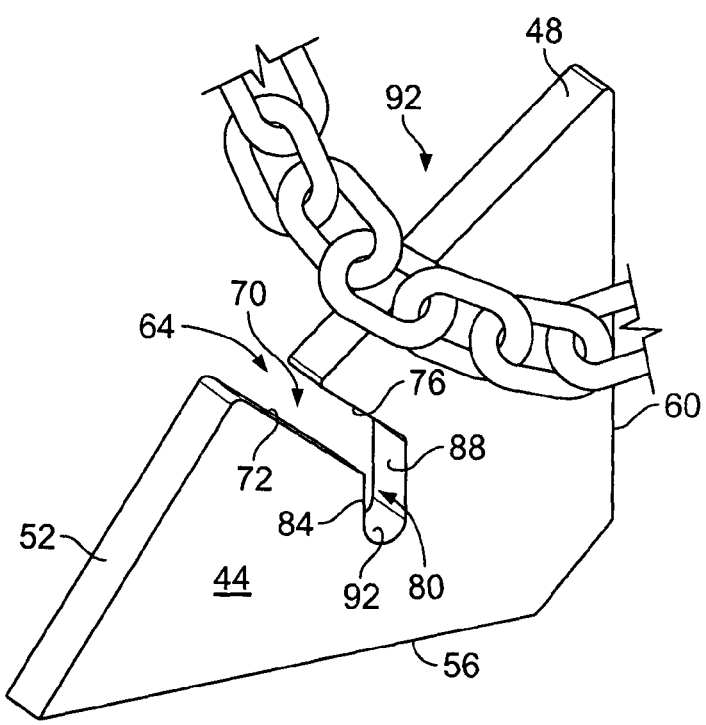
FIG. 14 is a perspective view of the chain locking device with a chain resting on a sloping surface of the chain locking device to begin sliding towards a slot of the chain locking device.

In an embodiment of the invention, the chain member 92 is coupled to the locking assembly 40 by placing the chain member 92 on the surface 48 of the locking assembly 40. Subsequently, the chain member 92 slides down the surface 48 (which slopes downwardly) until contacting the surface 72 of the upper slot 70. After contacting surface 72, the chain member 92 commences to slide along the surface 72 and subsequently passes into the upper slot 70 which is defined by opposed surfaces 72 and 76. While chain member 92 passes through upper slot 70 it is traveling towards the lower slot 80. After the chain member 92 passes through the upper slot 70, it then moves into the lower slot 80 which is partly defined by opposed surfaces 84 and 88. When the chain member 92 is within the lower slot 80, a link 93 of the chain member 92 lodges in the lower slot 80, as best shown by the dashed lines in FIGS. 11, 12 and 13. When link 93 is in this position, links immediately contiguous on both sides of the link 93, prevent link 93 from moving out of the lower slot 80. Thus, link 93 is locked within the lower slot 80 for steadfastly holding the chain member 92 in place. The arrow A in FIG. 13 is representative of the path of travel for the chain member 92.

In other embodiments of the invention, the chain member 92 may be placed (e.g., by hand or otherwise) essentially directly into upper slot 70, thus bypassing the step or procedure of having the chain member 92 slide along the surface 48. In such an embodiment surface, 72, would typically be contacted by the chain member 92 before passing into the upper slot 70. The passage of chain member 92 along the surface 72, through upper slot 70, and into lower slot 80 may be by any suitable procedure, such as by gasping by hand the chain member 92 and pulling the chain member 92 through upper slot 70 and into lower slot 80. In an embodiment of the invention, chain member 92 is allowed to pass by gravity along the surface 72, through the upper slot 70 and into the lower slot 80. In further embodiments of the invention, after the chain member 92 is placed on surface 48, gravity causes the chain member 92 to pass in direction of the arrow A in FIG. 13. Thus, no further human actions are needed to cause the chain member 92 to travel the path of arrow A in FIG. 13 for eventually lodging in lower slot 80. As previously mentioned, when a link, such as link 93, is lodged in lower slot 80, link 93 is generally steadfastly lodged within the lower slot 80 and is prevented from leaving the same by contiguous link members disposed on opposed sides of the link (e.g., link 93).

Figure 15:
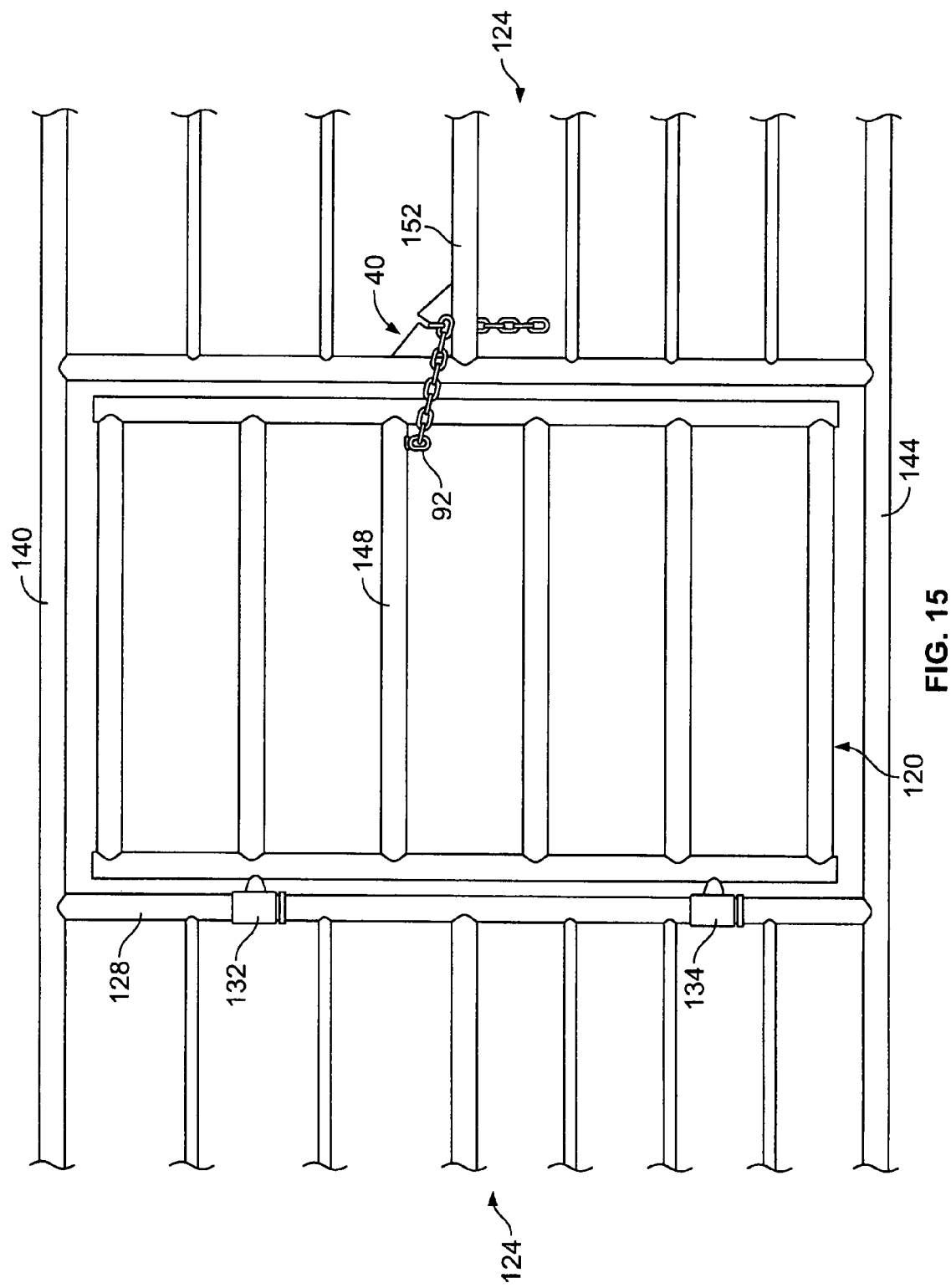
FIG. 15 is an elevational view of an embodiment of the portable-corral door member having a chain secured thereto, and coupled to the panel member of the collapsible portable corral by the chain engaging the chain locking device which is supported by the panel member.

As previously indicated the combined chain member 92/locking assembly 40 may be employed to couple together any various corral members of the collapsible portable corral. By way of example only and as illustrated in FIG. 15, the combination of the chain member 92 and the locking assembly 40 may be used to couple a corral door, generally illustrated as 120, to a portable corral panel member 124. The corral door 120 is pivoted to an upright bar 128 of the panel member 124 by collar type hinges 132 and 134. The portable corral panel member 124 has an upper cross bar 140 and a lower cross bar 144. The corral door 120 includes a cross bar 148 to which an end of the chain member 92 connects. The locking assembly 40 (e.g., a locking device) connects to and is supported by bar member 152 of the panel member 124. When the corral door 120 is in a closed posture as illustrated in FIG. 15, the corral door 120 is in a pivotal closed position to, and within, the panel member 124, and the face of the panel member 124 is generally flush with the face of the panel member 124. The corral door 120 may swing in either directions for opening and closing the corral door 120 for any suitable purpose, such as for leaving and exiting a pen.

Figure 6:
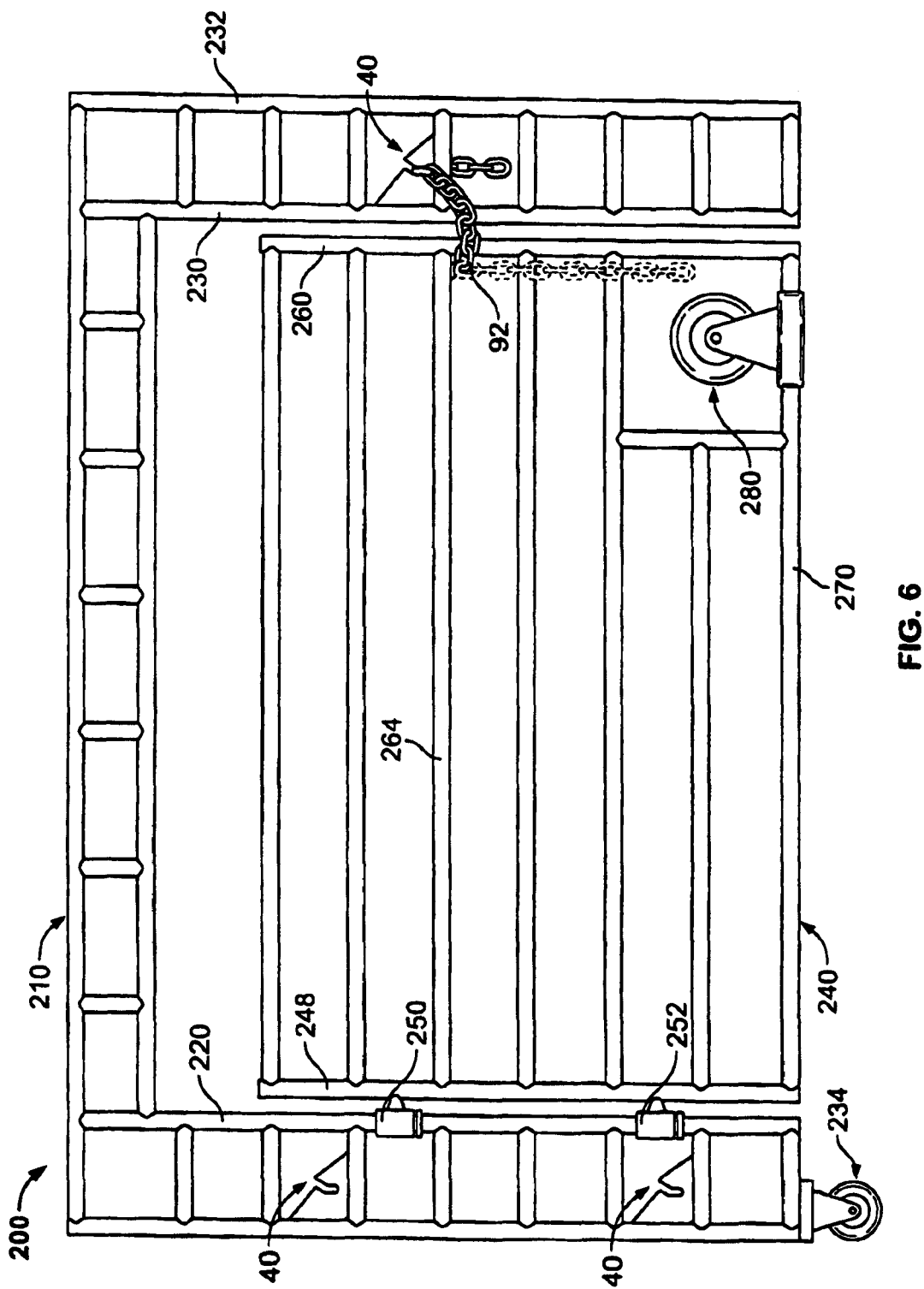
FIG. 6 is a side elevational view of an embodiment of a support structure having a gate with one end of the gate pivotally secured to the support structure and the other end of the gate having a chain coupled thereto and engaging a locking assembly supported by the support structure.
Figure 9:
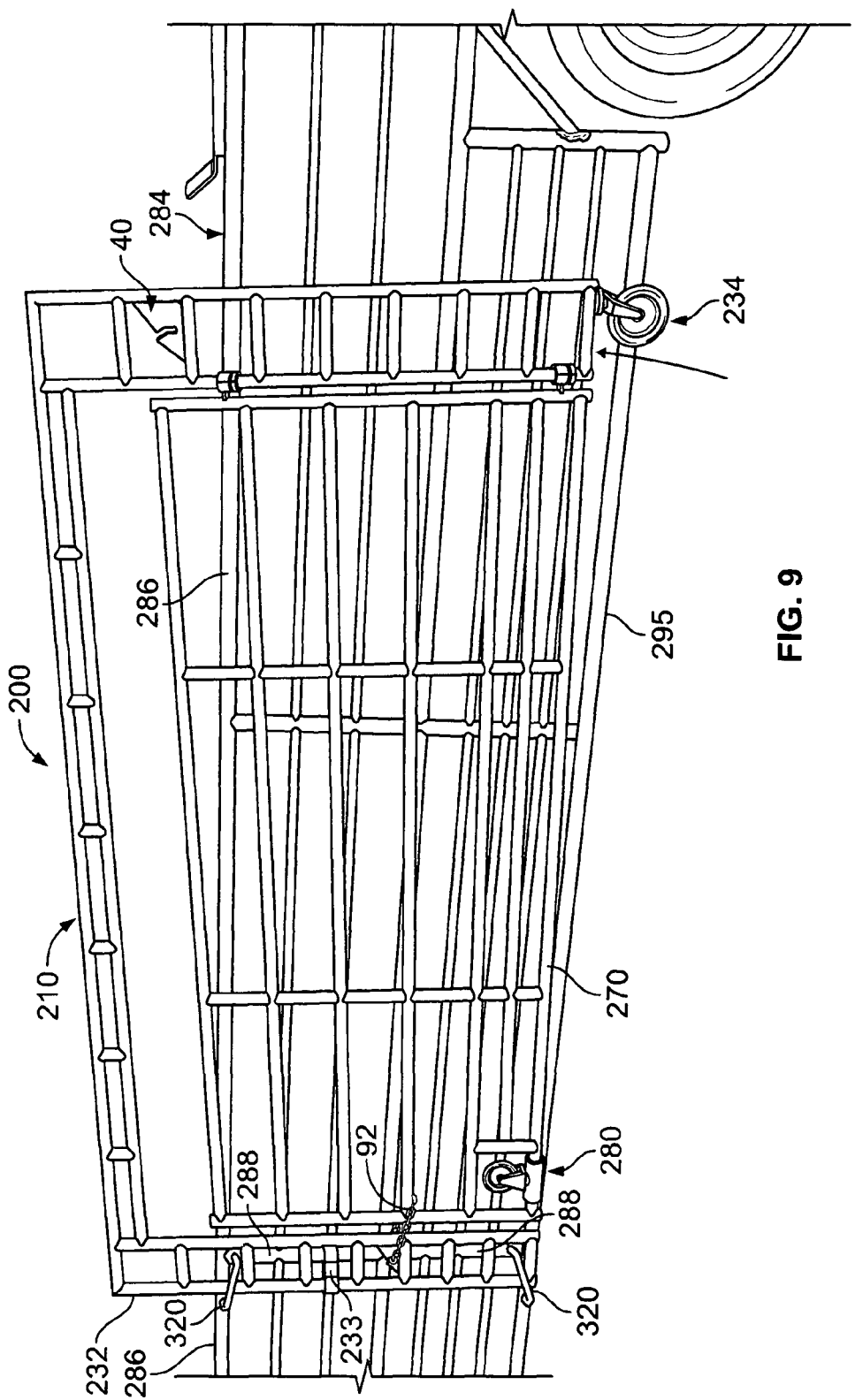
FIG. 9 is another embodiment of a collapsible portable corral having a combined gate-support structure/pivotally-secured gate, disposed and collapsed against a panel for positioning the combined gate-support structure/pivotally-secured gate in a folded position for being towed by a vehicle along with other collapsed panels.
Figure 10:
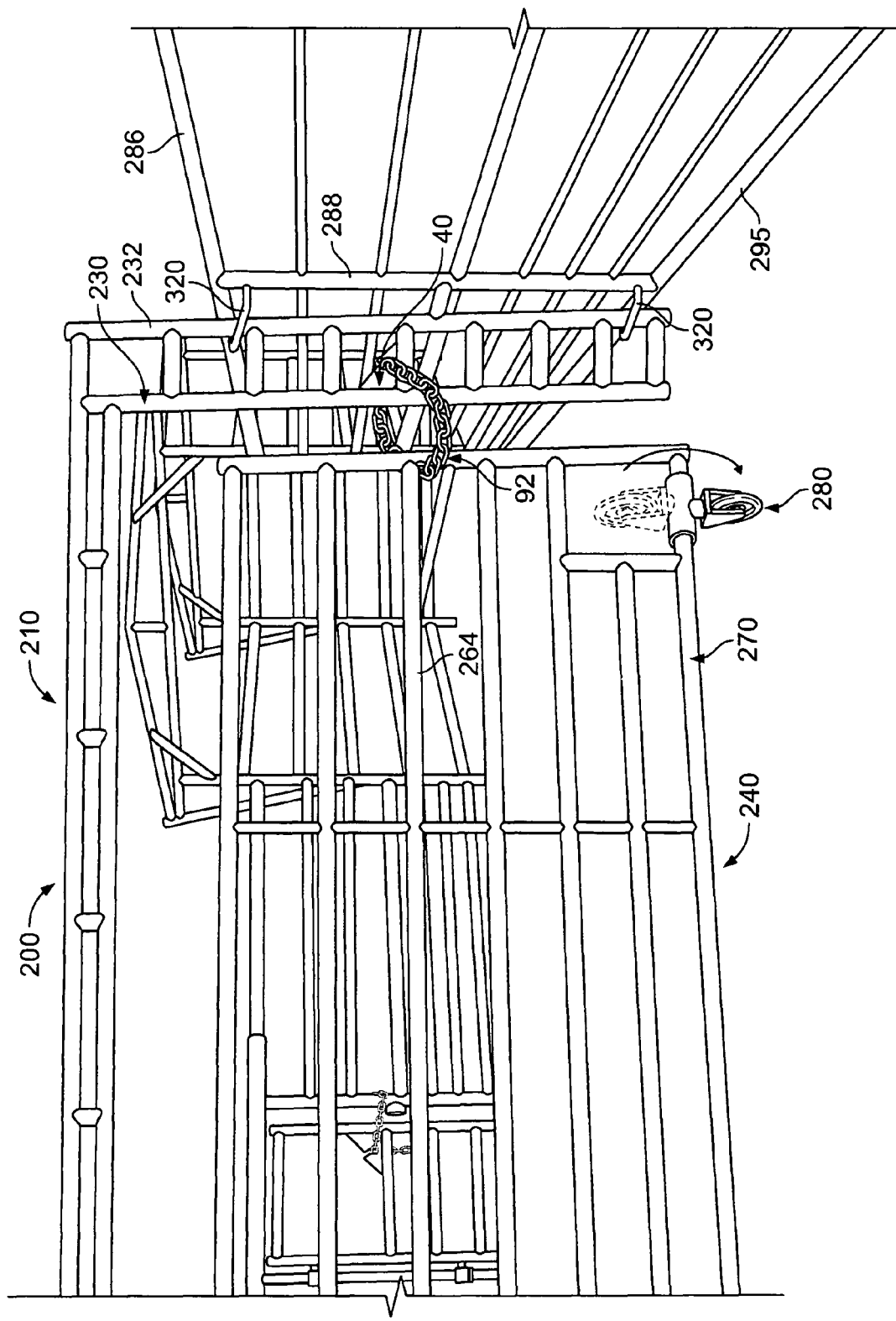
FIG. 10 is another embodiment of a collapsible portable corral having a combined gate-support structure/pivotally-secured gate, disposed in an operative posture with an embodiment of a locking a chain coupled to a locking device, and with dashed lines representing a position of the castor wheel when the gate is to be moved in its arc (arcuate) path towards a panel for being collapsed against the panel, such as illustrated in FIG. 9.

Referring now to FIGS. 6, 9 and 10, there is seen another portable-corral member or accessory which may employ the locking assembly 40. More specifically, a gate assembly, generally illustrated as 200, is illustrated in FIGS. 6, 9 and 10. The gate assembly 200 includes a gate support structure 210, which has a generally U-shaped appearance in an embodiment of the invention, and a gate member, generally illustrated as 240. The gate support structure 210 has upright support bars 220, 230 and 232. One end of the gate support structure 210 is supported by a wheel assembly 234, e.g., as castor wheel. The gate member 240 has an upright bar member 248 which is pivotally coupled by collar hinge members 250 and 252 to upright support bar 220 of the gate support structure 210. The gate member 240 also includes upright bar member 260, and cross bar members 264 and 270. The end of a chain member 92 is connected to cross bar member 264 and passes over the cross bar member 264 and over upright support bar 230 for engaging the locking assembly 40, as best shown in FIG. 6. A rotatable wheel assembly, generally illustrated as 280, is rotatably engaged to cross bar member 270 such as to pivot down when desired in an operative position, as shown in FIG. 10, and to pivot up when the combination of the gate member 240 and the gate support structure 210 are to be stored and collapsed against a panel member, generally illustrated as 284, as best shown in FIG. 9. As previously indicated, FIG. 9 illustrates an embodiment of a collapsible portable corral having the combined gate-support structure 210/pivotally-secured gate member 240, disposed and collapsed against the panel member 284 (see FIG. 9) for positioning the combined gate-support structure 210/pivotally-secured gate member 240 in a folded position for being towed by a vehicle along with other collapsed panels.

Continuing to refer to FIGS. 9 and 10, there is seen the panel member 284 comprising upper panel cross bar 286, lower panel cross bar 295, and upright panel vertical bar 288 which is hinged to upright support bar 232 by hinge 233 (see FIG. 9). There is also seen the gate assembly 200 movably coupled to panel member 284 by retainers 320-320 which are generally U-shaped bar members that are open to allow upright support bar 232 of the gate support structure 210 to pass therethrough. One of the retainers 320 cross connect from upright panel vertical bar 288 to the upper panel cross bar 286, and the other retainer 320 cross connects from upright panel vertical bar 288 to the lower panel cross bar 295. The movable passing of upright support bar 232 through the retainers 320 allow the gate assembly 200 to rotate towards the panel member 284 for storage and traveling purposes.

To collapse the gate assembly 200 against panel 284, the side of the gate support structure 210 having upright support bar 220 is decoupled from any contiguous panel to which it is engaged by removing the chain members 92, which are coupled to the contiguous panel, from the locking assemblies 40 (see FIG. 6) juxtaposed to the upright support bar 220 of the gate support structure 210. Subsequently, the gate assembly 200 is moved towards the panel 284 with the assistance of wheel assembly 234 which takes a general arcuate path as gate assembly 200 travels towards panel 284. As the gate assembly 200 is being moved, upright support bar 232 is rotating within the retainers 320-320. Wheel assembly 280 may be conveniently rotated from its down positioned, as illustrated in FIG. 10, to its up position, as illustrated as dashed lines in FIG. 10 and as solid lines in FIG. 6. The gate assembly 200 is continually moved until it is in contact with and positioned against the panel 284, as best shown in FIG. 9. The gate assembly 200 may be secured to, or held against, the panel 284 by any suitable means.

Figure 5:
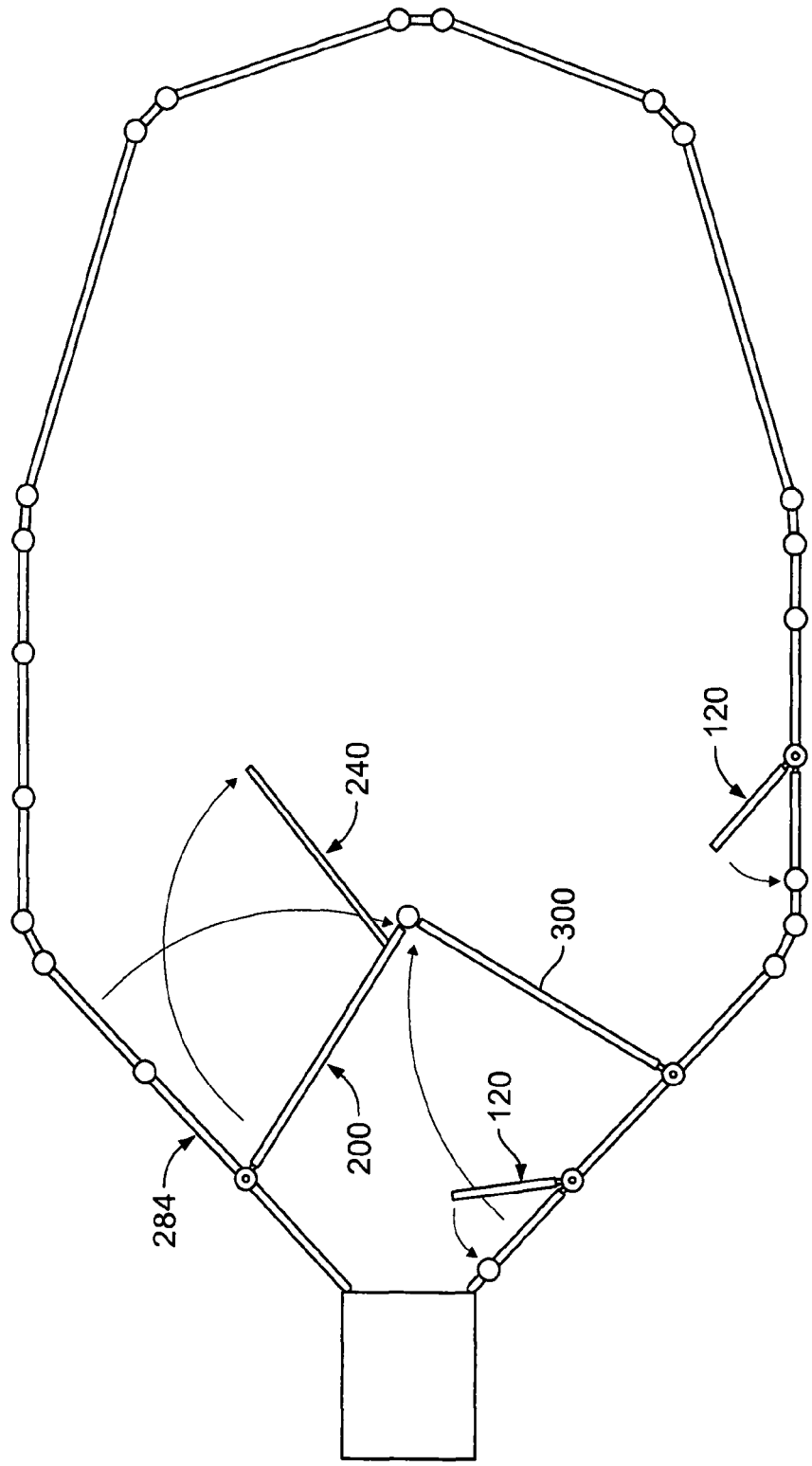
FIG. 5 is a top plan view of an embodiment of a collapsible portable corral disposed in an open posture with the arrows indicating the movement of gate assemblies coupled to a panels, and the movement of the door members positioned within panels or fences of the portable corral.
Figure 7:
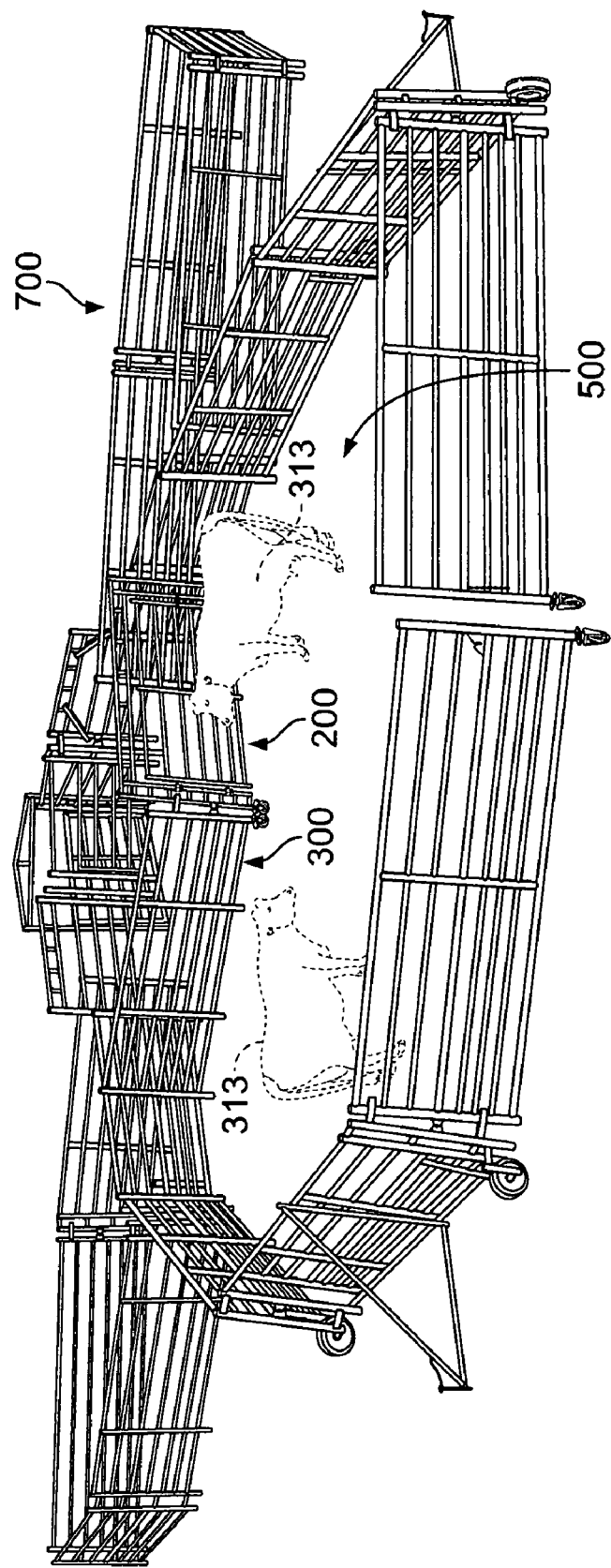
FIG. 7 is a perspective view of an embodiment of a portable corral having panels pivotally disposed such that various pens have been formed for sorting of livestock.
Figure 8:
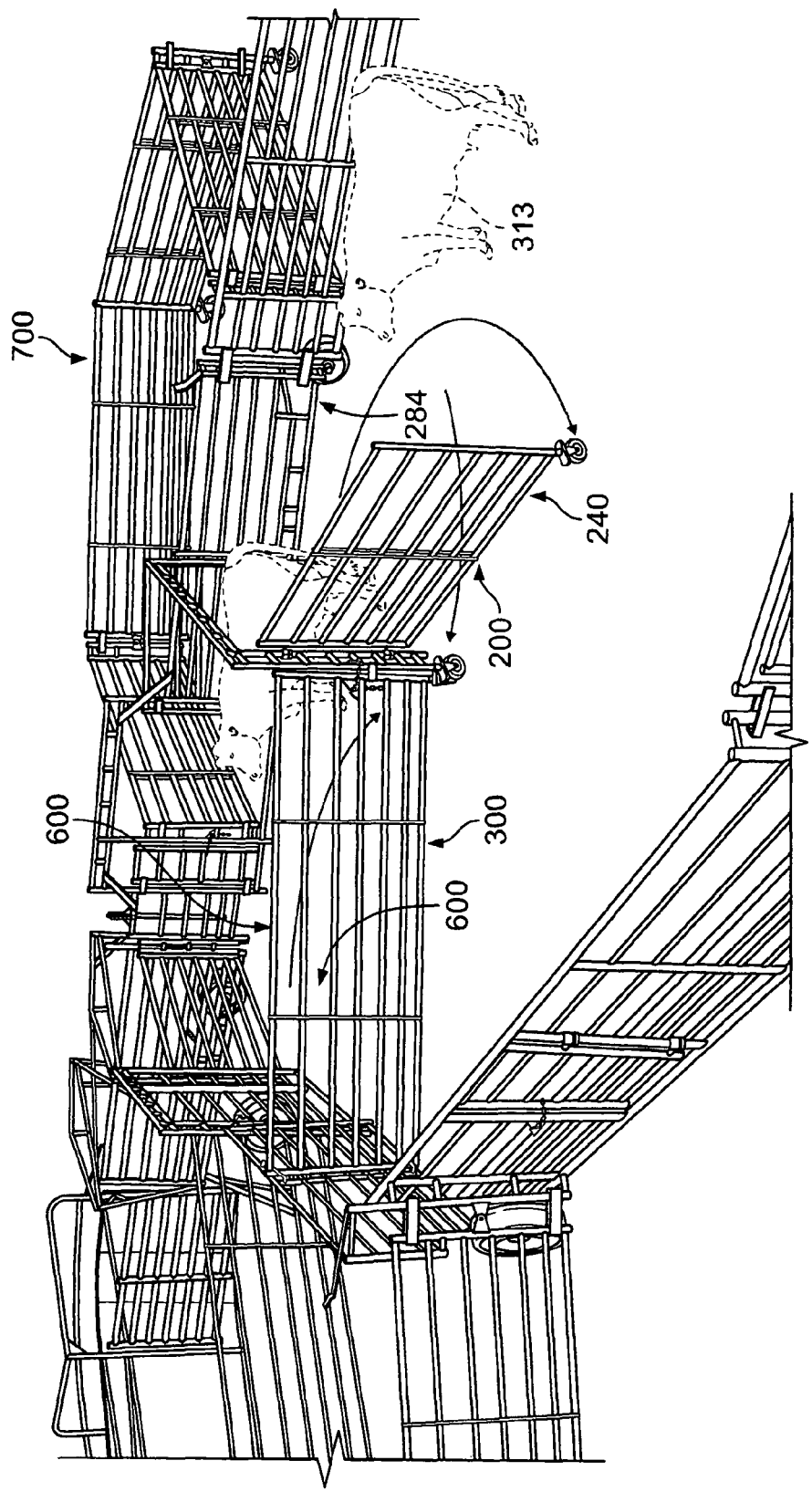
FIG. 8 is a perspective view of an embodiment of a collapsible portable corral having panels pivotally disposed with livestock passing through an open gate which is pivotally coupled to a gate support structure.

Referring now to FIGS. 5, 7 and 8, there is seen schematic illustrations for employing the gate assembly 200 for directing the movement of livestock. As previously indicated, FIG. 5 is a top plan view of an embodiment of a collapsible portable corral disposed in an open posture with the arrows indicating the movement of a gate assembly 200 (which is coupled to panel 300), and the movement of the door members 120 positioned within panels or fences. FIG. 7 illustrates cows 313 confined to pen 500. When it is desired to move cows 313 from pen 500, the gate member 240 is opened, as shown in FIG. 8 to provide an exit opening for the cows 313 to leave pen 500 and enter a holding pen 600. After the desired number of cows 313 has left pen 500, the gate member 240 of the gate assembly 200 may be closed. From the holding pen 600 the cows 313 may enter wing pen 700. The entrance of the wing pen 700 may be provided with a closure member (e.g., gate assembly 200) to prevent the cows 313 from immediately entering wing pen 700. In another embodiment of the invention, the wing pen 700 may have no closure member, which would enable the cows 313 to immediately pass from holding pen 600 into wing pen 700. In this embodiment, the door member 240 of the gate assembly 200 would not have to be immediately closed. It is to be understood than there may be more than one wing pen 700 which has access to the holding pen 600.

Reference throughout this specification to "one embodiment", "an embodiment", or "a specific embodiment" means that a particular feature, structure, or characteristic described in connection with the embodiment is included in at least one embodiment of the present invention and not necessarily in all its embodiments. Therefore, the respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Additionally, any arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of the illustrated embodiments of the present invention and are to be included within the spirit and scope of the present invention.

Therefore, while the present invention has been described herein with reference to the particular embodiments thereof, a latitude of modification, various changes and substitutions are intended in the foregoing disclosures, and it will be appreciated that in some instances some features of the embodiments of the invention will be employed without the corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for locking a chain in a locking device comprising:
   (a) sliding a chain member along a first surface of a locking device until contacting a second surface;
   (b) sliding the chain member along the second surface of the locking device until reaching a distal end of the second surface; and
   (c) passing the chain member from the distal end of the second surface into a slot of the locking device for locking the chain member in the slot.

2. The method of claim 1 wherein said second surface is higher than said first surface with respect to a plane along the surface of the first surface.

3. The method of claim 2 wherein said second surface is generally normal with respect to the plane along the surface of the first surface.

4. The method of claim 1 wherein said slot includes a first slot surface generally parallel to and opposed to a second slot surface.

5. The method of claim 4 wherein a plane along the surface of the first slot surface forms an oblique angle with respect to a plane along the surface of the second surface of the locking device.

6. The method of claim 5 wherein said locking of the chain member in the slot comprises vertically positioning a link of the chain member in the slot.

7. The method of claim 4 wherein said locking device additionally comprises a third surface which is generally parallel to the second surface of the locking device, said third surface and said second surface define a channel where through the chain passes before lodging in the slot.

8. The method of claim 7 wherein a plane along the surface of the second slot surface forms an oblique angle with respect to a plane along the surface of the third surface of the locking device.

9. The method of claim 7 additionally comprising grasping the chain member and subsequently releasing the grasped chain member after the chain member has been positioned at the entrance of the channel.

10. The method of claim 1 additionally comprising grasping the chain member before said sliding the chain along a first surface, and subsequently releasing the grasped chain member after the chain member has been positioned over the first surface.

11. The method of claim 1 wherein said locking of the chain member in the slot comprises vertically positioning a link of the chain member in the slot.

12. The method of claim 1 wherein said the locking device is supported by a portable-corral member.

13. A method for coupling together a pair of portable-corral members comprising:
   (a) providing a chain member coupled to a first portable-corral member;
   (b) engaging the chain member with a chain lock coupled to a second portable corral member; and
   (c) locking the chain member in the chain lock to couple the first portable-corral member to the second portable-corral member, said locking comprises sliding the chain member along a planar surface of a first surface of the chain lock until contacting a second surface which is higher than said planar surface.

14. The method of claim 13 wherein said first portable-corral member comprises a portable-corral panel; and said second portable-corral member comprises a portable-corral door coupled to and within the portable-corral panel.

15. The method of claim 14 wherein said portable-corral door pivotally connects to and within the portable-corral panel and is generally flush with said portable-corral panel when said portable-corral door is in a closed position within said portable-corral panel.

16. The method of claim 13 wherein said first portable-corral member includes a gate-support structure, and said second portable-corral member includes a portable-corral gate coupled to the gate-support structure.

17. The method of claim 16 additionally comprising a wheel assembly coupled to the portable-corral gate.

18. The method of claim 13 wherein said locking further comprises sliding the chain member along the second surface of the chain lock until reaching a distal end of the second surface, and passing the chain member from the distal end of the second surface into a slot of the chain lock for locking the chain member in the slot.

19. The method of claim 18 wherein said slot includes a first slot surface generally parallel to and opposed to a second slot surface.

* * * * *